Figure 1:
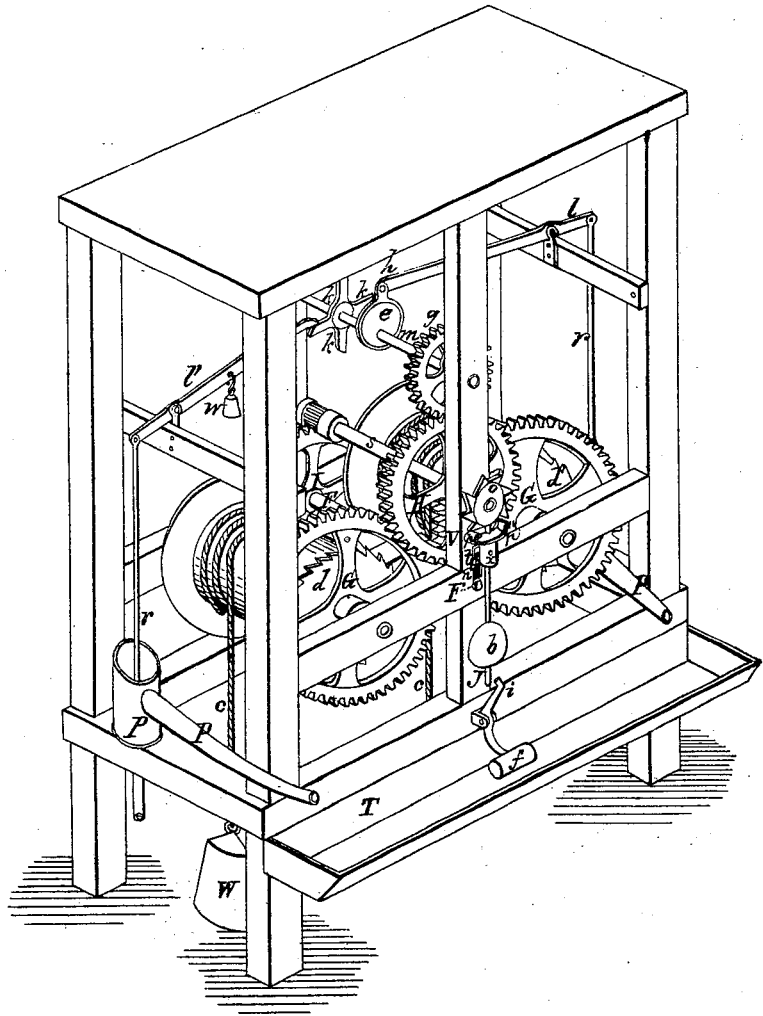

G. C. Canfield,
Water Elevator.
No. 102,655.

Patented May 3, 1870.
2 Sheets, Sheet 1.

Witnesses:
B. C. Converse
G. C. Rawlins

Inventor:
Geo. C. Canfield

G. C. Canfield,
Water Elevator.
No. 102,655. Patented May 3, 1870.
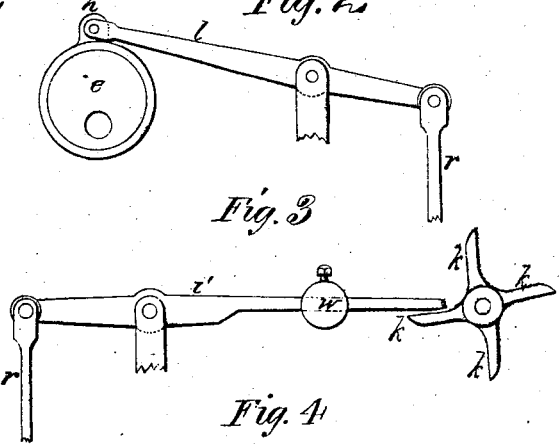
Fig. 2.
Fig. 3
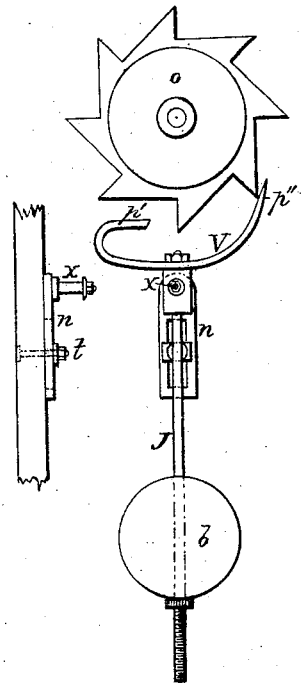
Fig. 4
Witnesses.
B. C. Converse.
G. C. Rawlins.
Inventor.
Geo. C. Canfield.

United States Patent Office.

GEORGE C. CANFIELD, OF MECHANICSBURG, OHIO.

Letters Patent No. 102,655, dated May 3, 1870.

IMPROVEMENT IN WATER-ELEVATORS.

The Schedule referred to in these Letters Patent and making part of the same

*To all whom it may concern:*

Be it known that I, GEORGE C. CANFIELD, of Mechanicsburg, in the county of Champaign and State of Ohio, have invented certain new and useful Improvements in Machinery for Raising Water for Stock and other purposes; and I do hereby declare that the following is a full, clear, and exact description thereof, reference being had to the annexed drawings and to the letters marked thereon, similar letters indicating like parts.

My invention consists in the application of machinery for pumping or raising water for stock or other purposes, which is driven by weights and a pendulum motion acting automatically in stopping and starting.

I am aware that ordinary clock-work machinery has been applied as a means of transmitting power for various purposes, but in applying that kind of mechanism for the purpose of raising water I have improved certain parts and added others, thereby changing the whole for the uses and purposes herein set forth.

In my machine I use one or more of the common or suction-pumps, worked by wheel-gearing, through which the power is transmitted by a weight or weights to the levers or handles of the pumps or the sucker-rods of the same.

The weights are suspended by cords wound upon drums on the shafts of the "great" wheels, which are provided with ratchets and pawls, as in ordinary weight clocks. Both wind in the same direction instead of in opposite directions like the common clock.

The "great" or driving-wheels mesh into a central pinion on a shaft between the two, and parallel with their shafts, as shown in drawings, the ends of their bearings being on same line. In ordinary clocks these wheels mesh into separate pinions.

An eccentric disk is mounted upon a shaft above the escapement-gear, which is flexibly attached to the lever which works the pump on one side of the machine, and a wheel with four lifting-arms is also mounted upon the same shaft, and works the lever or pump-handle on the other side, (see drawings.) Either or both of these devices may be used for working the pumps.

The pump-lever, which is worked by the lifting-arms, has a weight attached to it to bring it down when raised by the revolving arms.

The escapement-wheel is made with teeth at an angle of forty-five degrees. The verge is made of peculiar shape, so as to conform to the escapement-wheel in contact and release. The verge and pendulum, unlike those in ordinary clocks, are rigidly attached together by a rod, upon which is cut a screw-thread for raising and lowering the ball to change the vibrations of the pendulum.

The verge and pendulum swing on a pivot which projects from a sliding plate. This plate is slotted, and is held in place by a set-screw, (which can be seen below the escapement-wheel,) so that they can be raised or lowered to change the motions of the pendulum by causing the pallets of the verge to mesh more or less into the teeth of the escapement-wheel.

The escapement-wheel may be attached to either of the shafts in the machine by making the ball on the pendulum-rod heavier or lighter, according to the impelling force required and the movement of the shaft to which it is attached.

The pumps are shown in the drawings on each side of the machine, with their discharge-pipes directed into a trough in front for watering stock.

A float is shown hinged to the side of the trough, with an extended arm bent in such form as to come in contact with the pendulum when the water in the trough rises to a certain height.

The pendulum is stopped by contact with the arm of the float, and the machine stops running. As soon, however, as the water in the trough is lowered, the float is lowered with it, its arm is thrown away from the pendulum which resumes its vibratory motion, and the machine goes on pumping as before. The height to which the float rises may be regulated by discharge-holes in the trough, if necessary.

Figure 1 is an isometric view of my machine, showing the frame-work which supports the machine, the wheel-gearing, and pump-attachments.

G G represent the "great" or driving-wheels, which have ratchets $d\ d$ and pawls. They have drums, with flanges or rims on their shafts, to prevent the cord $c$ from getting off the drums in winding.

W is one of the weights shown suspended from the drive-wheel. The back ends of the drive-wheel shafts are square, so that they can be wound with a key, as in an ordinary clock.

These wheels mesh into the central pinion on shaft of gear-wheel I, and this into the escapement gear-wheel H, which meshes into the gear-wheel $g$ above it.

The escapement-wheel $o$ is seen on the front of the machine, and below it the verge V and pendulum ball $b$.

The upper shaft $m$ of the machine has an eccentric disk, $e$, hinged to the lever $l$ of the pump on one side of the machine, and on the same shaft is seen the wheel $a$ with four arms, $k\ k$, for lifting the lever $l'$ of the pump P.

A weight, W, is fastened to this lever to bring it down again after it is lifted.

$r\ r$ are pump-rods, shown on each side of the machine.

On winding the machine up the pendulum $b$ is set in motion, and power is transmitted through the several parts of the gearing to the wheel $g$ on the shaft $m$, and through the eccentric $e$ and four-armed wheel

*a*, to the two pump-levers *l* and *l'*, which raise the water from the well or spring and discharge it through the pipes *p p* into the trough T.

When this is full the float *f*, (which may be made of either wood or metal,) rising with the water, its angular arm *i* is thrown forward in the way of the rod J of the pendulum *b*, and thus stops the machine.

On the water being drawn from the trough the float *f* sinks down, bringing the angular arm *i* with it, thus releasing the pendulum, which resumes its motion the same as before.

Figure 2 shows the eccentric *e*, with its lever *l*, to which it is flexibly attached by the hinge-joint *e'*.

Figure 3 shows the four-armed wheel *a*, with its lever *l'*. The arms *k k* may be either attached to a wheel, as shown, or the shaft may be pierced with arms. Either form can be used.

Figure 4 represents the different portions of the escapement.

O is the escape-wheel, which is shown with teeth formed at an angle of forty-five degrees.

V is the verge, its pallets *p'* and *p''* constructed so that the greatest amount of leverage may be given to them by the teeth of the escape-wheel, thereby more easily starting the pendulum when it is stopped.

The pendulum-rod J is seen rigidly attached to the verge V, while the ball *b* can be raised or lowered on the rod, which has a screw-thread cut upon it for the purpose.

*n* is a slotted plate, with a pivot, *x*, projecting from it upon which the pendulum swings. This plate can be raised or lowered to regulate the motions of the pendulum and to adjust the verge to the escape-wheel.

*t* is a set-screw to hold the plate *n* in its position.

Having thus described my invention,

What I claim as new, and desire to secure by Letters Patent, is—

1. The arms *k k k k*, when attached to shaft *m*, and used in combination with lever *l'*, gearing mechanism, cord *c*, weight W, and escapement device, substantially as shown and described, for the purpose specified.

2. The combination of trough T, hinged float *f*, pendulum rod J, and escapement device, substantially as shown and described, for the purpose specified.

Witness my hand to my application for an "improvement in machinery for raising water," this 20th day of October, 1869.

GEO. C. CANFIELD.

Witnesses:
B. C. CONVERSE,
G. C. RAWLINS.